Dec. 19, 1950  L. T. WOMACK ET AL  2,534,493
HYDROELECTRIC GEAR SHIFT
Filed Dec. 16, 1947  6 Sheets-Sheet 1
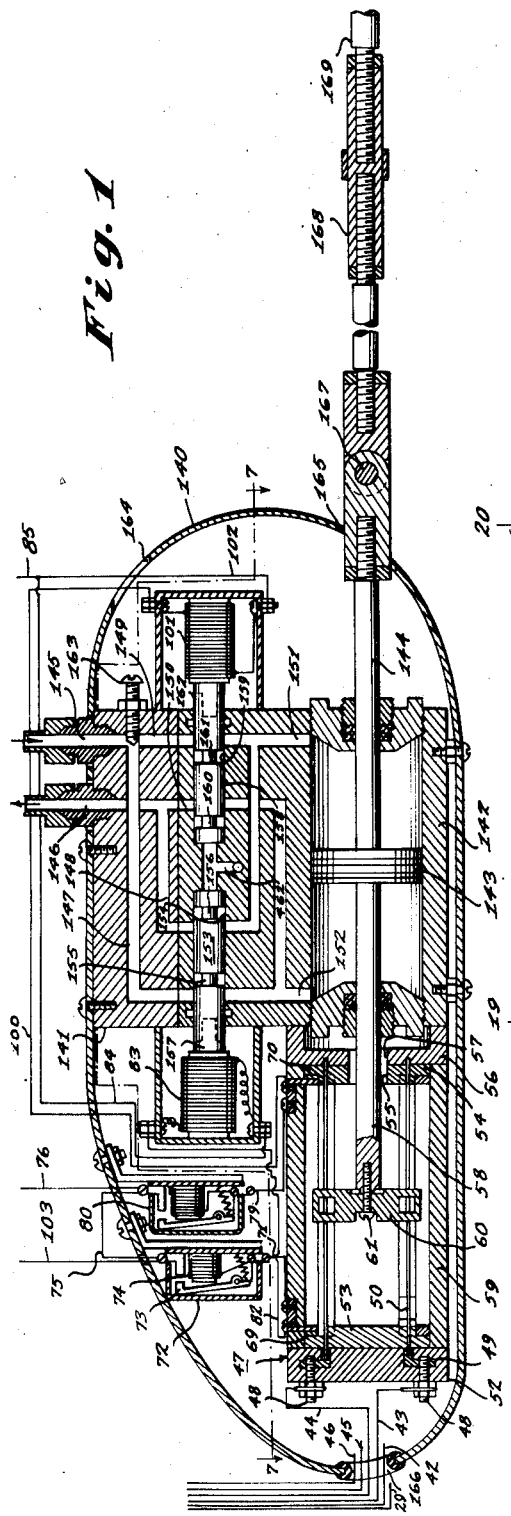
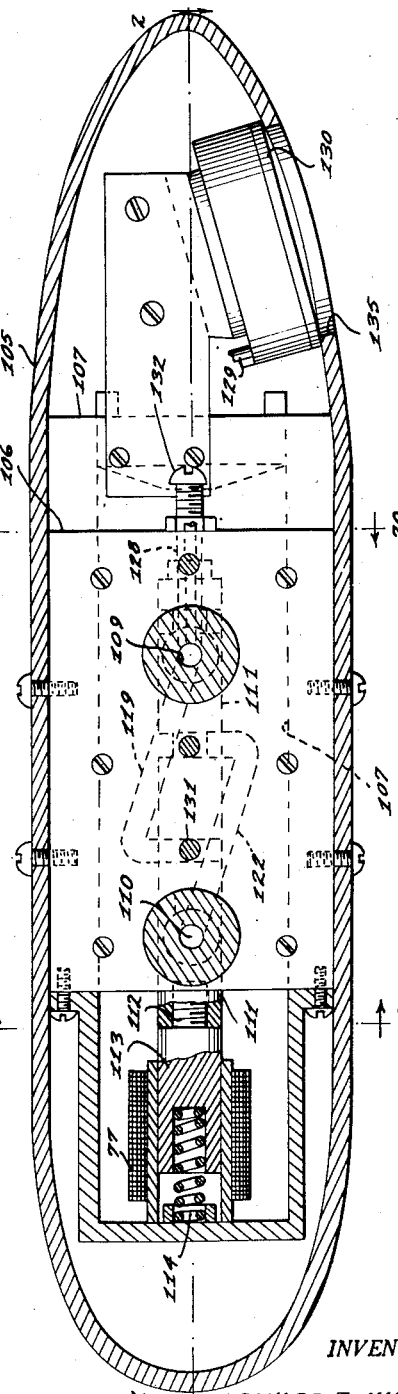
INVENTORS
LEONARD T. WOMACK
BY AND JEWELL J. WOMACK
McMorrow, Berman + Davidson
ATTORNEYS

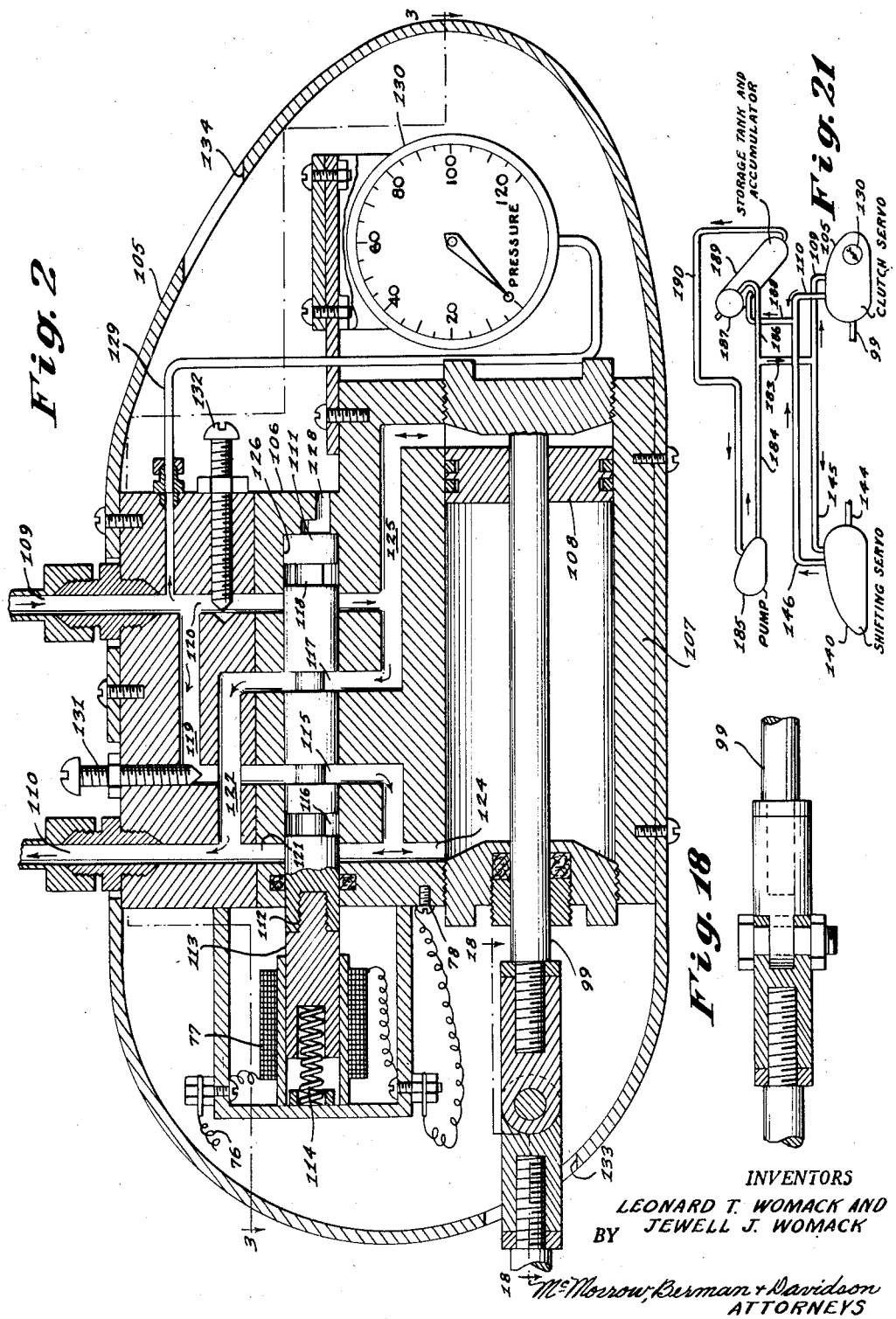

Dec. 19, 1950    L. T. WOMACK ET AL    2,534,493
HYDROELECTRIC GEAR SHIFT
Filed Dec. 16, 1947    6 Sheets-Sheet 3
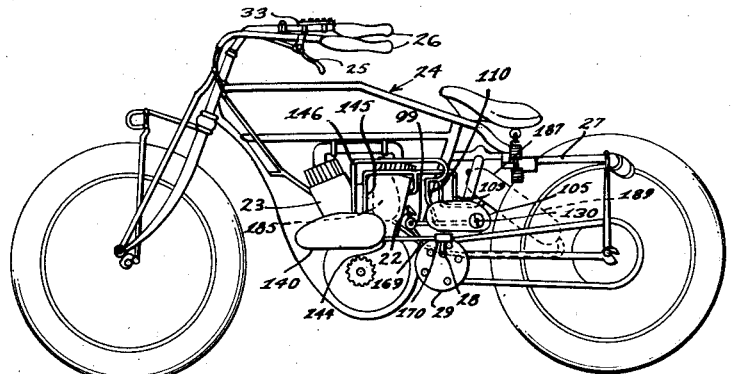
Fig. 4
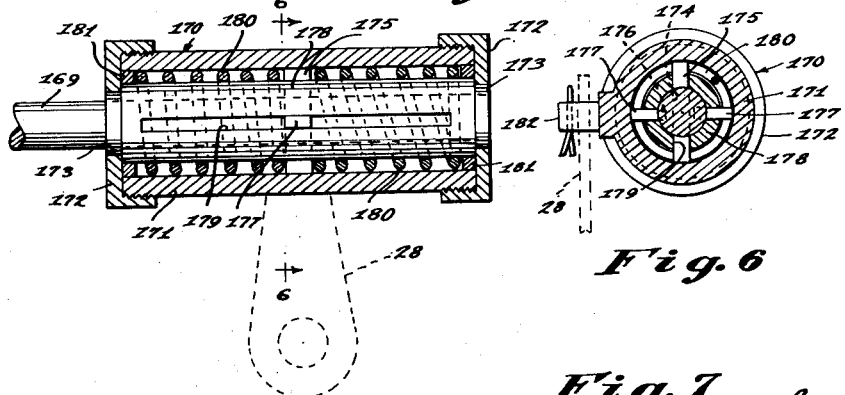
Fig. 5    Fig. 6
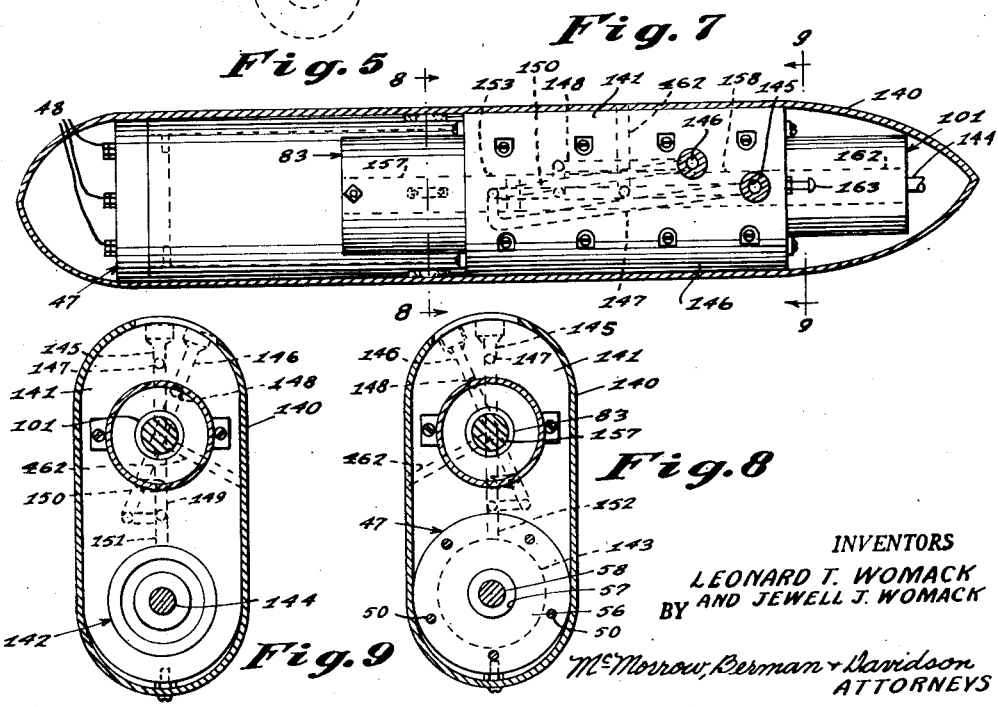
Fig. 7
Fig. 9    Fig. 8
INVENTORS
LEONARD T. WOMACK
AND JEWELL J. WOMACK
BY McMorrow, Berman + Davidson
ATTORNEYS Dec. 19, 1950 L. T. WOMACK ET AL 2,534,493
HYDROELECTRIC GEAR SHIFT
Filed Dec. 16, 1947 6 Sheets-Sheet 4
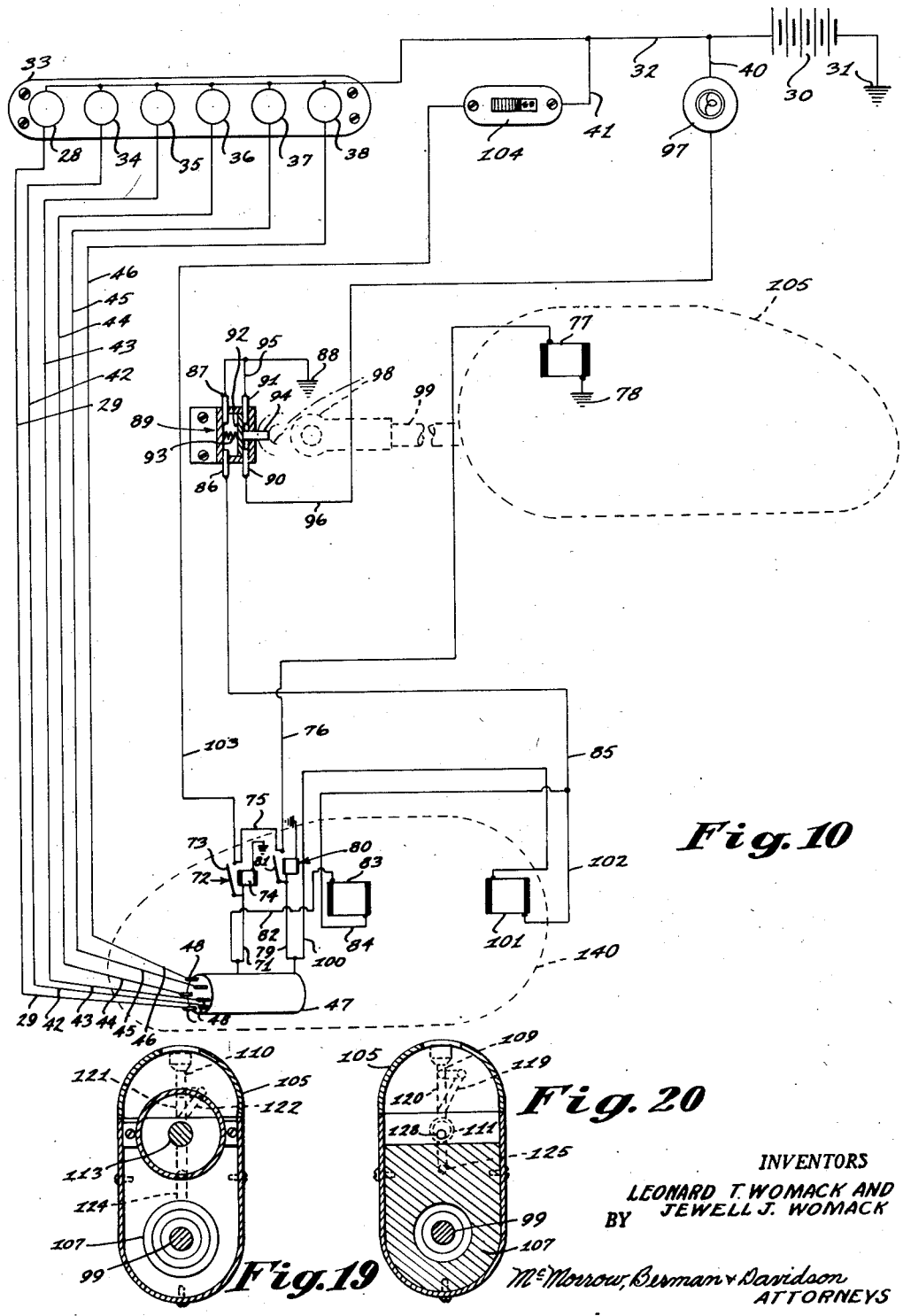
INVENTORS
LEONARD T. WOMACK AND
JEWELL J. WOMACK
BY
McMorrow, Berman & Davidson
ATTORNEYS

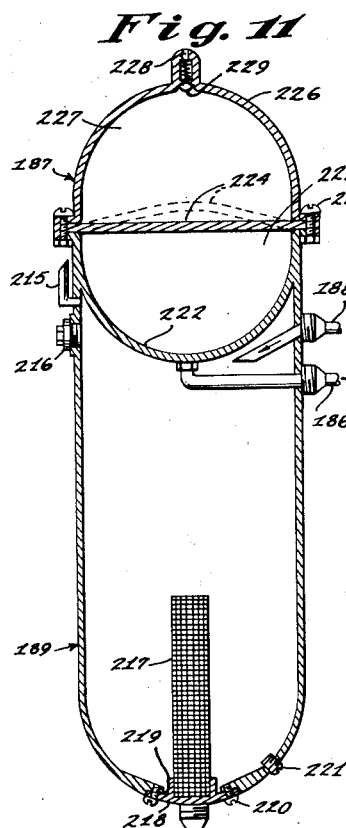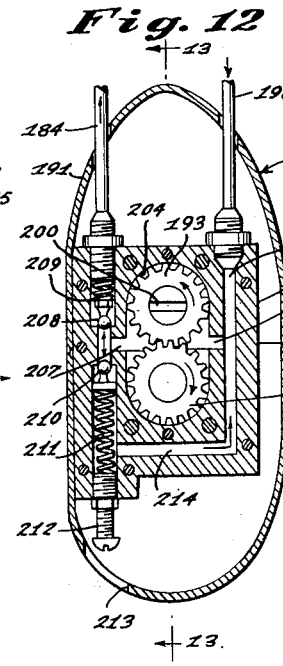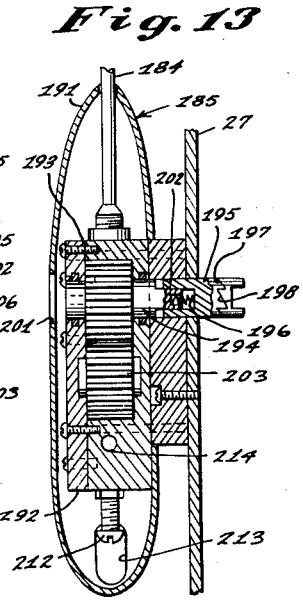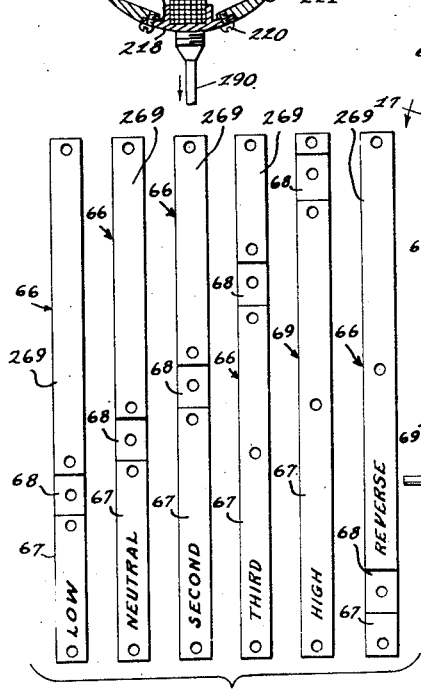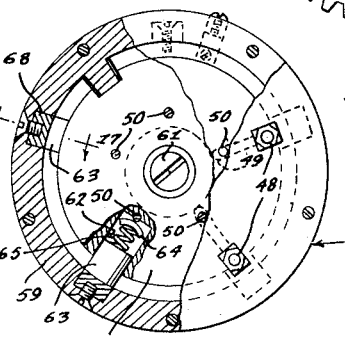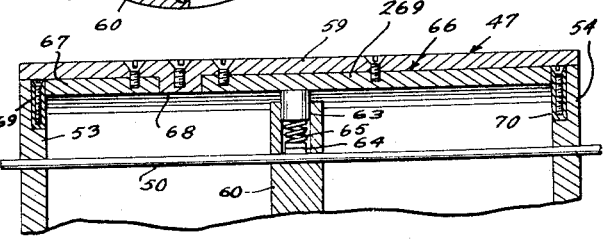

INVENTOR.
LEONARD T. WOMACK
BY JEWELL J. WOMACK

Patented Dec. 19, 1950

2,534,493

UNITED STATES PATENT OFFICE 2,534,493

HYDROELECTRIC GEARSHIFT

Leonard T. Womack and Jewel Jackson Womack, Carpinteria, Calif.

Application December 16, 1947, Serial No. 791,968

14 Claims. (Cl. 192—3.5)

Our invention relates to electrically-controlled, hydraulically-actuated, gear-shifting devices for variable speed transmissions. The device according to the invention relates more specifically to such gear-shifting devices as are applicable to the transmissions of motor vehicles, particularly motorcycles, but is readily applicable to any variable speed transmission.

With the foregoing in view, an object of our invention is to provide an improved hydro-electric clutch and gear-shifting mechanism for a variable speed transmission.

A further object is to provide an improved hydro-electric clutch and gear-shifting mechanism for a variable speed transmission wherein a selector taps a source of electric power which is then operative to actuate hydraulic clutch-engaging mechanism, and is thereafter operative to actuate a hydraulic gear-shift mechanism, and which thereafter automatically re-engages the clutch, power for said hydraulic mechanism being supplied by a pump driven by the engine of the motor vehicle or, alternatively, when such engine is not running, from either a source of hydraulic fluid under pressure or from a manually-actuated pump.

A further object is to provide an improved hydro-electric clutch and gear-shifting mechanism which includes a novel hydro-electric mechanism for disengaging and engaging a clutch for a transmission.

A further object is to provide an improved hydro-electric clutch and gear-shifting mechanism for a variable speed transmission which includes a novel hydro-electric mechanism for actuating gear-shifting mechanism for a transmission.

A further object is to provide an improved hydro-electric clutch and gear-shifting mechanism for a variable speed transmission which includes a novel closed hydraulic circuit, pump means for circulating fluid therein, and a source of hydraulic fluid under pressure.

A further object is to provide in a device such as that last described a novel hydro-electric clutch and gear-shifting actuating mechanism.

Other objects and advantages reside in the particular structure of the invention, combination and arrangement of the several parts thereof, and in the particular method or mode of operation, all of which will be readily apparent to those skilled in the art upon reference to the attached drawings in connection with the following specification, wherein the invention is shown, described and claimed.

In the drawings:

Figure 1 is a longitudinal vertical section through a preferred form of a hydro-electric servo mechanism for actuating a gear-shifting means;

Figure 2 is a view like Figure 1 through a preferred form of hydro-electric, clutch-actuating servo unit;

Figure 3 is a horizontal section taken substantially on the planes of the lines 3—3 of Figure 2;

Figure 4 is an elevation of a motorcycle showing the arrangement of the several parts of the invention relative thereto:

Figure 5 is a longitudinal vertical section through a detail of the invention;

Figure 6 is a transverse vertical section taken substantially on the plane of the line 6—6 of Figure 5;

Figure 7 is a longitudinal horizontal section taken substantially on the planes of the lines 7—7 of Figure 1, certain parts being omitted;

Figure 8 is a transverse vertical section taken substantially on the plane of the line 8—8 of Figure 7;

Figure 9 is a transverse vertical section taken substantially on the plane of the line 9—9 of Figure 7;

Figure 10 is a diagrammatic view of the electric circuit utilized in the invention;

Figure 11 is a longitudinal vertical section through a combined hydraulic fluid storage tank and hydraulic fluid pressure tank according to the invention;

Figure 12 is a longitudinal vertical section through a pump for the hydraulic fluid according to the invention;

Figure 13 is a horizontal section taken substantially on the plane of the line 13—13 of Figure 12;

Figure 14 is an end elevation of a detail of the pump of Figures 12 and 13;

Figure 15 is an end elevation with parts being broken away and parts shown in transverse vertical section of a detail of the hydro-electric unit shown in Figure 1;

Figure 16 is an exploded view showing a plurality of contacts utilized in the hydro-electric unit of Figure 15;

Figure 17 is a fragmentary longitudinal vertical section taken substantially on the line 17—17 of Figure 15, parts being omitted;

Figure 18 is a fragmentary elevation of a detail with parts being shown in longitudinal vertical section and taken substantially on the planes of the line 18—18 of Figure 2;

Figure 19 is a transverse vertical section taken substantially on the plane of the line 19—19 of Figure 3;

Figure 20 is a transverse vertical section taken substantially on the plane of the line 20—20 of Figure 3;

Figure 21 is a schematic view showing the hydraulic system according to the invention, apart from the motor vehicle.

Figure 22:
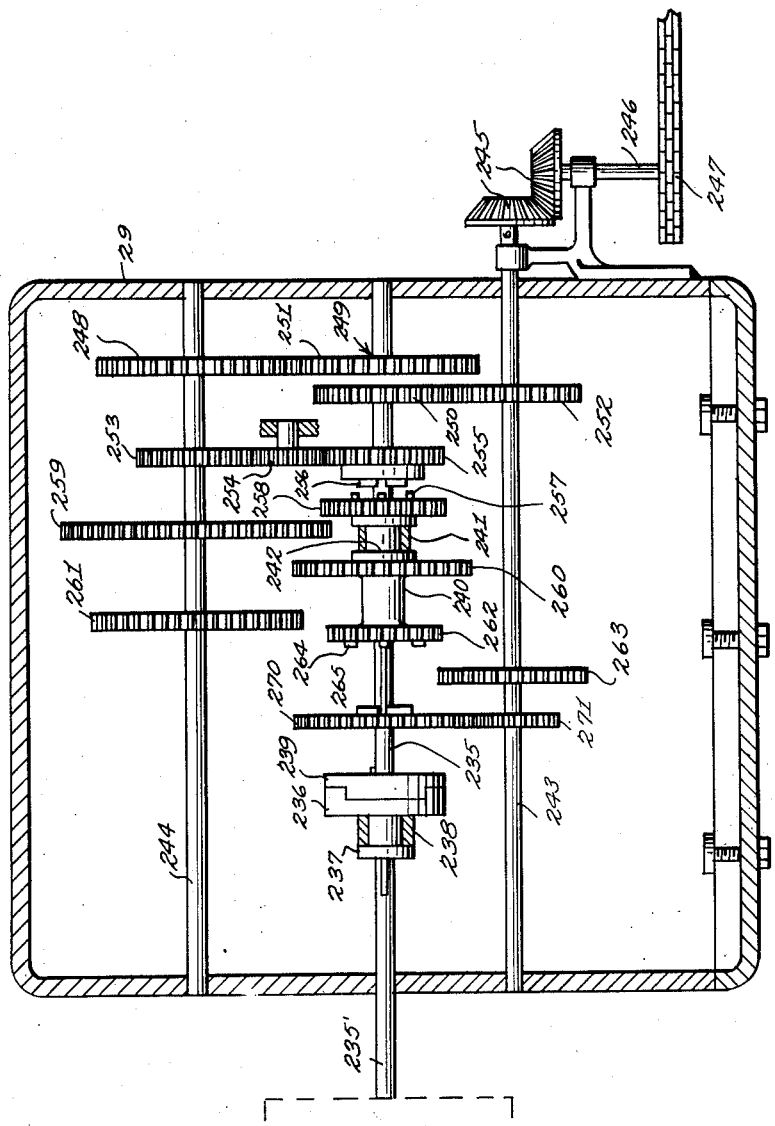
Figure 22 is a diagrammatic sectional view showing the transmission gears and clutch.

The invention disclosed specifically hereinafter includes an electrical system which is diagrammatically illustrated in Figure 10, and which is powered by a motor vehicle battery. Such electrical system comprises a plurality of electric circuits, some of which are shown diagrammatically in Figure 10, and which circuits are operatively associated with a hydraulic circuit, Figure 21. The hydraulic circuit includes a pump, Figures 12 and 13, which is driven either by hand or by the motor of a motor vehicle. Also included in the hydraulic circuit is a storage tank, Figure 11, for spent hydraulic fluid, an accumulator tank, Figure 11, for storing hydraulic fluid under pressure, and means for operating the clutch and the gear-shifting mechanism. Such last-named means comprises a hydraulically-powered, electrically-controlled clutch servo, Figures 2, 3, 19 and 20, for engaging and disengaging the clutch, and a hydraulically-powered, electrically-controlled gear-shifting servo, Figures 1, 7, 8, and 9, for performing gear-shifting acts. The operation of the invention, briefly, comprises initial actuation of a selector means, which is effective to close a selected circuit to the clutch servo to actuate the same to disengage the clutch. Thereafter, upon completion of the disengagement of the clutch, the selected circuit is completed to the gear-shifting servo, whereby to actuate the same to perform a selected gear-shifting act. At the completion of the selected gear-shifting act, the clutch servo is again actuated to engage the clutch.

Referring now to Figure 4, 24 designates generally and diagrammatically a motorcycle having a pair of handle bars 26 which may include a brake lever 25 for actuating brakes, not shown. The motorcycle includes a frame 27 of any suitable form on which is mounted the usual engine 23 which is operatively connected to a clutch and transmission housing 29. A bell crank 28 is pivoted in the housing 29 for shifting the gears contained therein, and a clutch pedal 22 is also operatively connected to the housing 29 for engaging and disengaging the clutch in the usual manner. The gears in the housing 29 are of any suitable or usual form for motorcycles, and it is to be understood that shifting of the gears to vary the speed ratio is accomplished by moving the bell crank 28 in either a clockwise or a counter-clockwise direction in the usual manner. It is to be understood that while we have disclosed a device according to our invention as applied to a motorcycle, the device is equally applicable to the shifting of gears in other devices and/or motor vehicles wherein the shifting is accomplished by straight-line movement of a single actuating member.

Thus, Figure 22 illustrates by way of an example and in diagrammatic form, a clutch and transmission suitable for use with our device. As there illustrated, the engine 23 is provided with a drive shaft 235' extending into the housing 29. The shaft 235 has splined thereon a driving clutch element 236 provided with a collar 237 adapted to be engaged by a fork 238 for moving the driving clutch element into and out of engagement with a driven clutch element 239 fixed to a shaft 235. The fork 238 is operatively connected to a clutch servo piston rod 99 the operation of which will be described more fully hereinafter. A triple gear 240 is splined on the shaft 235' inwardly of the housing 29 and is shiftable therealong by a fork 241 engaging a collar 242. The fork 241 is operatively connected to the shaft of the bell-crank 28 whereby to shift the gear 240 upon rocking of the bell-crank 28 in a well known manner. A pair of counter-shafts 243 and 244 are disposed in the housing 29 in spaced parallel relation to the shaft 235. The counter-shaft 243 comprises a take-off shaft and has a free end extending outwardly of the housing 29. Such free end is connected by bevel gears 245, stub shaft 246 and sprocket 247 to the chain drive for the rear wheel of the motorcycle. The counter-shaft 244 has fixed thereon a spur gear 248 which is in mesh with a spur gear portion 251 of a double spur gear 249 freely rotatable on the shaft 235. The portion 251 is of the same ratio as the spur gear 248 whereby no speed change is accomplished. Likewise, the counter-shaft 243 has fixed thereon a spur gear 242 of the same size as the other gear portion 250 of the double gear 249. Thus, motion may be transmitted from the counter-shaft 244 to the take-off shaft 243 without any speed change. A reverse gear 253 is fixed to the counter-shaft 244 and is in constant mesh with a reverse idler 254 which in turn is meshed with a spur gear 255 freely rotatable on the shaft 235. The gear 255 is provided with axially directed teeth 256 adapted to mesh with complementary teeth 257 formed on the end surface of the gear portion 258 of the triple gear 240. Thus, with the parts in the position shown, the device is in neutral but if the triple gear 240 is moved to the right, the same will be engaged with the gear 255 whereby to drive the sprocket 247 in a direction the reverse of the normal travel of the motorcycle. The counter-shaft 244 is also provided with a spur gear 259 adapted to mesh with the gear portion 258 of the triple gear when the same is moved to the left of the position shown in Figure 22. The gear 259 comprises a low gear. Further movement of the triple gear 240 to the left causes a central and larger gear portion 260 to mesh with a "second" gear 261 fixed on the countershaft 244. Still further movement of the triple gear 240 to the left causes the other end gear portion 262 to be meshed with a "third" gear 263 fixed on the counter or take-off shaft 243. Still further movement of the triple gear 240 to the left causes the end teeth 264 of the gear portion 262 to mesh with complementary teeth 265 formed on the abutting surface of a spur gear 270 freely rotatable on the shaft 235. The gear 270 is in constant mesh with a high gear 271 fixed on the take-off shaft 243. Thus, with the clutch members 236 and 239 engaged, the triple gear 240 rotates constantly with the shaft 235 moreover, it is obvious that by moving the triple gear 240 from right to left along the driven shaft 235, the device is successively operated in reverse, neutral, first, second, third and high gears.

Referring now to Figure 10, the electric system, which is disclosed diagrammatically there, is powered by the usual motor vehicle battery 30 which is grounded, as usual, at 31. While the system is diagrammatically shown in Figure 10, elements of the system are disclosed in Figures 1, 2, 3, 7, 8, 9, 15, 16 and 17, and will be referred to more specifically hereinafter. Also, for the sake of simplicity, the diagram of Figure 10 has been restricted to the particular leads and circuits incident to the invention, and all other circuits, such as the ignition circuit for the motor vehicle and the light circuit, have been eliminated. A lead 32 from the battery 30 extends to a selector unit 33 which is preferably mounted on one of the handle bars 26 of the motor vehicle by any suitable means. The selector unit 33 includes a plurality of selector switches 28, 34, 35, 36, 37 and 38 of any suitable character. Such switches respectively close circuits to leads 29, 42, 43, 44, 45 and 46 extending therefrom. The selector switches aforesaid may be of any suitable form and comprise no part of the present invention. Interposed between the selector unit 33 and the battery 30 are a pair of branch leads 40 and 41, the purpose of which will be described later. Obviously, the number of selector switches and leads will vary in accordance with the number of speed changes in a given transmission.

Referring now to Figure 1 in conjunction with Figure 10, the ends of each of the leads 29 and 42 to 46, inclusive, are connected to individual binding posts 48 of a junction box 47. For the purpose of simplicity, in Figure 1, only the leads 44 and 43 have been shown connected to binding posts. Each of the binding posts 48 is connected to a connector 49 which is embedded in an outer end wall 52 of the junction box 47. The junction box 47 is substantially hollow and cylindrical in form, and comprises outer end walls 52 and 56, inner end walls 53 and 54 which are slightly smaller in diameter than the outer end walls and which are surrounded by a cylindrical side wall 59. The side wall 59 surrounds the peripheries of the inner end walls and the free end edges of such side wall seat against the inner surface of the outer end walls 52 and 56. All of the end walls and the side wall are preferably connected together to comprise a unit by any suitable means, not shown. Also, the outer and inner end walls, as well as the side wall, are preferably made of insulating material of any suitable character.

Each connector 49 is operatively connected to one of a plurality of slide rods 50 which are formed of current-conducting material and which extend axially of the junction box 47 in concentric relation to the axis thereof. Such rods 50 extend through the inner end walls 53 and 54 and are seated in the outer end wall 56. Each of the inner end wall 54 and outer end wall 56 is provided with aligned, axially-disposed apertures 55 and 57 therethrough for a purpose to be described later. In brief, however, such aligned apertures 55 and 57 permit the free passage therethrough of a piston rod extension 58, the free end of which is connected in any suitable manner, as by the screw 61, to a disc-like slider 60.

The slider 60 is preferably made of insulating material and is provided with an annular series of spaced apertures to slidably receive the slide rods 50, whereby the slider 60 is freely slidable thereon. Referring specifically to Figure 15, the slider 60 is provided with a plurality of radially-extending passages 62, the inner ends of which at least partially expose outer surfaces of the slide rods 50. A brush 63 is radially slidable in each of the passages 62 and is loaded for radial outward movement by any suitable spring means 65. The inner end of each spring 65 is formed with a shoe 64 of any suitable form which slidably engages the exposed surface of the slide rod 50.

The outer end of each brush 63 slidably engages a stationary contact generally indicated at 66 and which is counter-sunk in the inner surface of the cylindrical outer wall 59 of the junction box. There is a separate stationary contact 66 for each brush 63, and each of such stationary contacts is insulated from the other. Each of the stationary contacts 66 comprises a section 67 of current-conducting material and a section 269 which is likewise of current-conducting material, and which sections are separated by a block 68 of insulating material. The block 68 is of such a length that a brush 63 may be seated thereon without being in contact with either of the sections 67 or 269, whereby to break a circuit previously established through the brush 63, for a purpose to be described later. As is apparent from Figure 16, wherein all of the stationary contacts 66 are displayed in exploded relation, each of the sections 269 and 67 is of a different length. Also, such insulating blocks 68 are staggered, whereby when assembled in the cylindrical wall 59, the insulating blocks describe a spiral, or helix. Opposite ends of the stationary contacts 66 are connected by connector rings 69 and 70 which are embedded respectively in the inner walls 53 and 54 of the junction box.

The connector ring 69 is connected by a lead 71 to a relay 72 in such a manner that the current flowing in the lead 71 actuates the coil 74 of the relay to attract the armature 73 thereof, whereby such current will thereafter flow through the armature 73 to a further lead 75, see Figures 1 and 10. The relay 72 is a one way relay in that the coil 74 will be energized only when current flows thereto through lead 71. However, with the coil 74 deenergized whereby armature 73 is in the open position of Figure 10, the relay will not be actuated by current flowing in lead 75 or lead 103, to be described later. The lead 75 is operatively connected to a further lead 76 which is connected to one pole of a clutch servo solenoid 77, the opposite pole of which is grounded, as at 78. As will appear later, the clutch servo solenoid 77 is effective to control the engagement and disengagement of the clutch. The opposite connector ring 70 is connected, as by a lead 79, to a second one way relay 80 which is similar to the relay 72 whereby the passage of current through the lead 79 not only actuates the relay, but also transmits current through the armature 81 thereof to the lead 76 aforesaid. However, with armature 81 open, the relay cannot be actuated by current flowing in leads 76, 75 or 103 all of which are connected together, Figure 10.

The connector ring 69 of the junction box is also connected by a lead 82 to one end of the coil of a solenoid 83 of a gear-shifting servo to be described later. The other end of the coil of the solenoid 83 is connected by a branch lead 84 to a main lead 85 which in turn is connected to a stationary contact 86 of a switch 89. A second stationary contact 87 of the switch is grounded in any suitable manner, as at 88. The switch 89 also includes a pair of spaced contacts 90 and 91 which are normally bridged by a movable contact 92. A spring 93 loads the movable contact 92 for bridging the stationary contacts 90 and 91. A branch lead 95 connects the stationary contact 91 to the ground 88. The movable contact 92 has an actuating arm 94 which extends outwardly of the housing for the switch 89 for a purpose to be described later. The stationary contact 90 is connected by a lead 96 to a suitable signal 97, the opposite pole of which is connected by the branch lead 40 to the battery 30. Thus, in the normal position of the switch 89, the movable contact 92 bridges the stationary contacts 90 and 91 to close a circuit to the signal 97. It follows, then, that in the normal position of the switch 89, the circuit to the signal 97 is closed and the signal is actuated, and that when the movable contact 92 is moved to open such circuit and to bridge the stationary contacts 86 and 87, the circuit to the signal 97 will be broken. As is indicated in broken lines, Figure 10, the actuating arm 94 for the movable contact 92 is adapted to be engaged by the free end 98 of a clutch servo piston rod 99 and moved so that the movable contact 92 is extended across the stationary contacts 86 and 87 to bridge the same against the action of the spring 93. When this occurs, the circuit to the solenoid 83 will be grounded and the solenoid will, therefore, be energized. In like manner, the opposite connector ring 70 of the junction box is connected by a lead 100 to one terminal of the coil of a solenoid 101 of the gear-shifting servo to be described later. The opposite end of the coil of the solenoid 101 is connected by lead 102 to the lead 85 to the stationary contact 86 of the switch 89.

In the operation of the device as so far described, it will be apparent that upon the actuation of a selector button, say the button 35, current will flow through the lead 43 binding post 48 to the connector 49, thence to a slide rod 50, thence through an appropriate contact 64, spring 65 and brush 63 of the slider 60 to one of the stationary contacts 66. From there the current will flow to the connector ring 69 or the connector ring 70, depending upon which side of the insulating gap 68 the brush 63 happens to be located. Current will then flow through one of the leads 71 or 79 to one of the relays 72 or 80. From there current will flow through the lead 76 to the clutch servo solenoid 77 to actuate the same. At the same time, current will flow from one of the connector rings 69 or 70 through one of the leads 82 or 100 through one of the gear-shifting servo solenoids 83 or 101, lead 85 to the stationary contact 86 of the switch 89. However, the gear-shifting servo solenoids will not be energized because the switch 89 remains open until the clutch servo pison rod 99 has advanced to the left-hand position, Figure 10, at which point the movable contact has bridged the stationary contacts 86 and 87 to complete a circuit to the gear-shifting servos. Thereafter, by means to be described later, the gear-shifting servo will be effective to perform a selected gear-shifting act at the conclusion of which the slider 60 and its appropriate brush 63 will be centrally positioned on an insulating gap 68 for the particular gear-shifting act and will, therefore, break the circuit to both the clutch servo solenoid and to the appropriate gear-shifting servo solenoid. When this occurs, as will appear later, the clutch servo-solenoid 77 is de-energized, whereby the clutch servo piston rod 99 is retracted to re-engage the clutch. Obviously, this action also permits the spring 93 to return the movable contact 92 of the switch 89 to a position to bridge the stationary contacts 90 and 91 and re-energize the signal 97.

The other gear-shifting operations are performed in the same manner by actuating a different selector button, and inasmuch as current will then flow in the same manner to a brush 63 which is not located upon an insulating gap 68, a further gear-shifting act will be performed in the same manner. A lead 103 is connected to the lead 75 connecting the relays 74 and 80, and such lead 103 is connected to one pole of a toggle switch 104, the other pole of which is connected by a lead 41 to the lead 32 of the battery 30. Thus, the toggle switch 104 is in a direct circuit from the battery 30 to the clutch servo solenoid 77 by way of the leads 103, 75, and 76. Consequently, when the toggle switch 104 is closed, the clutch servo solenoid 77 will be energized irrespective of the rest of the circuits. This arrangement permits the driver of the vehicle to leave the vehicle in a selected gear when he stops by merely closing the toggle switch 104. This operation will disengage the clutch by energizing the clutch servo solenoid 77. Likewise, when the operator wishes to start up in the same gear, he merely opens the toggle switch 104 which permits the clutch to engage by deenergizng the solenoid 77. The signal 97 is actuated at all times when the clutch is engaged, and, therefore, serves as tell-tale.

Referring now to Figures 2 and 3, and to some extent to Figures 18, 19 and 20, the clutch servo will now be described. Such clutch servo comprises any suitable housing 105 which is preferably of streamline configuration, if mounted on the exterior of the vehicle, such as a motorcycle, and such housing has secured therein by any suitable means a hydraulic valve chest 106, a hydraulic cylinder 107, which includes a hydraulic piston 108 fixed on the inner end of the clutch servo piston rod 99 aforesaid. Hydraulic fluid is supplied to the valve chest 106 by means of an intake conduit 109 and spent hydraulic fluid is discharged from the valve chest by means of the exhaust conduit 110. A double-action slide valve 111 is slidable in the valve chest and is connected by any suitable means 112 to the outer end of the armature 113 of the clutch servo solenoid 77. An expansive spring 114 is operatively engageable with the armature 113 in any suitable manner to load the same in its normal position when the solenoid 77 is de-energized. The slide valve 111 is slidable in a passageway 126 which may be vented at one end, as at 128. The slide valve 111 is provided with longitudinally-spaced pairs of inlet ports 115 and 118, and with longitudinally-spaced exhaust ports 116 and 117. The intake conduit 109 is provided with a pair of branch intake conduits 119 and 120 which lead respectively by way of the intake ports 115 and 118 of the slide valve to opposite ends of the cylinder 107 by way of conduits 124 and 125. Such conduits 124 and 125 are combined intake and exhaust conduits. The exhaust conduit 110 likewise is provided with branch exhaust conduits 121 and 122 which open respectively into the two-way conduits 124 and 125 aforesaid through exhaust ports 116 and 117 of valve 111. The arrangement of the ports 115, 116, 117 and 118 is as usual with double-action slide valves in that when an intake port is open for one end of the cylinder, an exhaust port for the opposite end is open, and vice versa.

A branch conduit 129 opens off the main intake conduit 109 and leads to any suitable pressure gauge 130 for indicating the pressure in the intake line. Each of the branch inlet conduits 119 and 120 is provided with a suitable valve control 131 and 132, respectively, whereby a flow of fluid in either or both of such branch inlet conduits may be controlled for controlling the speed of operation of the piston 108, and, consequently, the speed by which the clutch is engaged or disengaged. The housing 105 for the clutch servo is provided with a suitable aperture 133 for the extension of the piston rod 99 therethrough, and a further aperture 134 may be provided for access to the speed control means 132. Likewise, a further aperture 135 is preferably provided to permit viewing of the pressing gauge 130. It is to be understood, further, that the housing 106 is composed of one or more parts, whereby the same may be taken apart to permit access to the various portions of the servo.

Referring specifically to Figure 2, the operation of this portion of the invention will be apparent. In Figure 2, the clutch servo-solenoid 77 is de-energized, whereby the spring 114 has assisted the general de-energizing movement of the armature 113 to move the slide valve 111 to a position where hydraulic fluid under pressure enters the valve chest 106 through the intake conduit 109, passes through the branch intake conduit 119, through the intake port 115 of the slide valve, and into the two-way conduit 124 for the left-hand end of the cylinder 107. With the valve in such position, it is obvious that the piston 108 will be driven to the right-hand end of the cylinder 107 and that exhaust or spent hydraulic fluid will be discharged from the cylinder by way of the two-way conduit 125, valve port 117, the branch exhaust conduit 122 and the main exhaust conduit 110. Likewise, when the solenoid 77 is energized, the armature 113 will be retracted to the left against the action of the spring 114, whereby the slide valve 111 is reversed to position the exhaust port 116 across the exhaust conduit branch 124 and simultaneously position the inlet port 118 across the branch inlet conduit 120. This arrangement permits hydraulic fluid under pressure to flow through the two-way conduit 125 to the right-hand end of the cylinder 107, whereby to drive the piston 108 to the left-hand end of the cylinder. This action extends the piston rod 98 to a position where, at the end of its stroke, it engages the member 94 of the movable contact 92 of the switch 89, Figure 10, to move the same to a position to bridge the stationary contacts 86 and 87 and thereby energize the gear-shifting servo solenoids 83 or 101. In like manner, upon de-energization of the clutch servo solenoid 77, the armature 113 returns to the position shown in Figure 2, whereby the free end 98 of the piston 99 is retracted out of engagement with the movable contact actuating member 92 which permits the spring 93 to return the movable contact across the stationary contacts 90 and 91 and break the circuit to the servo solenoids 83 or 101.

The gear-shifting servo, according to the invention, is basically disclosed in Figure 1, and supplemental views thereof are found in Figures 7, 8 and 9, while related parts to be described later are shown in Figures 5 and 6. Referring specifically to Figure 1, as well as Figures 7, 8 and 9, the gear-shifting servo comprises a housing 140 of any suitable form, but which is preferably streamlined, as shown, when used exteriorly on a motorcycle. The housing 140 has mounted therein in any suitable manner a valve chest 141 to which is attached a hydraulic cylinder 142 in which is slidably mounted a piston 143. The piston 143 has a piston rod 58 extending axially outwardly of the cylinder and to the free end of which is attached the slider 60 of the junction box 47, as previously described. The piston 143 is also provided with a second piston rod 144 which extends axially of the cylinder in an opposite direction to that of the piston rod 58. The second piston rod 144 also extends outwardly of the housing 140 and is operatively connected to gear-shifting means to be described later. Hydraulic fluid under pressure is supplied to the valve chest 141 by a main intake conduit 145 which is provided with a branch conduit 147 leading to the left-hand end of the cylinder 142, and a second branch conduit 149 leading to the right-hand end of the cylinder. Spent hydraulic fluid is discharged from the valve chest by the main exhaust conduit 146 into which opens the branch exhaust conduits 148 and 150. The branch inlet conduit 147 and the branch exhaust conduit 150 merge adjacent the left-hand end of the cylinder into a two-way conduit 152. In like manner, the branch inlet conduit 149 and the branch exhaust conduit 148 merge adjacent the right-hand end of the cylinder into a two-way conduit 151.

The valve chest 141 has mounted therein in a slideway 154 a single-action slide valve 153. The slideway 154 extends across the branch inlet passage 147 and the branch exhaust passage 148. The slide valve 153 is provided with an inlet port 155 and an exhaust port 156. One end of the slide valve 153 is connected in any suitable manner, not shown, to the free end of the armature 157 of the left-hand gear-shifting solenoid 83. When the solenoid 83 is de-energized, the slide valve 153 is so positioned that neither the branch inlet conduit 147 nor the branch exhaust conduit 148 is open. Thus, when the circuit to the solenoid 83 is open, the ports 155 and 156 are closed. The opposite end of the valve chest 141 is likewise provided with a slideway 159 in which is slidable a single-action slide valve 158. The slide valve 158 is provided with an intake port 161 and an exhaust port 160 which are registerable respectively with the branch inlet conduit 149 and the branch exhaust conduit 150. One end of the slide valve 158 is detachably connected by any suitable means, not shown, to the armature 162 of the second gear shift servo solenoid 101. As is the case of the first slide valve 153, when the solenoid 101 is de-energized, the normal position of the armature 162 positions the slide valve 158 so that both the branch inlet conduit 149 and the branch exhaust conduit 150 are closed. Thus, with both solenoids 83 and 101 de-energized, no fluid will flow in either direction through the valve chest and the piston 143 will remain in a balanced state at whatever point it had reached at the time of closing either the valve 153 or the valve 158. Both of the slideways 154 and 159 are preferably in axial alignment, and the adjacent ends thereof are preferably vented by any suitable vent 462. The inlet conduit 145 is provided with an adjustable valve member 163 which may comprise a threaded valve, whereby the flow of fluid to the branch conduits 149 and 147 may be controlled to regulate the speed of operation of the piston 143 and, consequently, the speed of the gear-shifting act. The housing 140 is formed with a suitable opening 164 therethrough to permit access to and actuation of the valve 163 and additional openings such as 165 and 166 may be provided for the passage of the piston rod 144 and the entrance of the leads 142 to 146, inclusive. Obviously, additional openings through the housing 140 may be formed or furnished as required. In like manner, the housing 140 is preferably made of several parts so that it may be opened to permit access to the servo parts contained therein.

The right-hand piston rod 144 for the piston 143 may comprise a plurality of articulated sections suitably connected together, as by a pivot 167 and a turnbuckle 168, Figure 1, and a terminal portion 169 of such piston rod is suitably connected in any suitable manner to a damping device generally indicated at 170, Figures 5 and 6. The purpose of the damping unit 170 is to provide a cushioned connection between the piston rod terminal end 169 and the bell crank lever 28 which accomplishes the actual shifting of the gears. The arrangement to be described is effective to prevent clashing and chipping of the gears when gears to be shifted are not in exact alignment. In effect, the device permits the gear-shifting servo to "feel" for the proper alignment as it shifts the gears.

The damping unit 170 comprises an outer cylinder 171 which is hollow and which has its ends closed by any suitable end caps 172. The end caps 172 are axially apertured, as at 173, for the free passage therethrough of the free end 169 of the gear shifting servo piston 144. Such free end is formed with a transverse vertical bore 174 on a portion normally positioned centrally of the cylinder 171. Such bore 174 has seated therein a cross-pin 175, the free ends of which extend outwardly of the end 169 and slidably abut the inner periphery of the cylinder 171. The free end 169 is also formed with a pair of oppositely-disposed transverse recesses 176 at right angles to the bore 174 and on planes intersecting the same. Each recess 176 seats the inner end of one of a pair of cross-pins 177, the outer ends of which also extend outwardly of the free end 169 and slidably abut the inner periphery of cylinder 171. An inner cylinder 178 concentrically surrounds the free end 169 and is formed with four radially-spaced and elongated pin slots 179, there being a slot 179 for the outer ends of each pin 175 and 177. A pair of coil springs 180 are concentrically disposed about opposite ends of the inner cylinder 178 with the inner free ends of the springs abutting opposite sides of the pins 175 and 177. Washers 181 are concentrically-disposed about the inner cylinder 178 and may be interposed between the outer ends of the springs 180 and the inner peripheries of the end caps 172. A bell crank pin 182 extends radially of the outer cylinder 171 and is fixed thereto. The bell crank pin 182 is pivotally connected to the free end of the bell crank 28, whereby to actuate the same in either direction upon reciprocation of the piston 144 and the free end 169 thereof.

It follows from the foregoing that upon reciprocation of the gear shift servo piston 144, the free end 169 thereof will reciprocate the damping unit 170, whereby to actuate the bell crank lever 28 in either direction. At the same time, upon actuation of the bell crank lever 28 and in the event that the gears are not properly aligned, such gears will resist meshing. Obviously, however, when this occurs, one of the springs 180 of the damping unit will yield to permit continued extension of the piston rod 144 and free end 169 thereof. At the same time, when the gears to be meshed do become aligned, the load of the spring 180 which has been compressed by this lost-motion action will suffice to mesh the gears without clashing of the same. The same action occurs irrespective of which direction the piston 144 is reciprocated to perform a gear-shifting act.

The gear-shifting servo and the clutch servo are operated by hydraulic fluid under pressure from a closed hydraulic circuit which is diagrammatically illustrated in Figure 21. Thus, the intake conduits 109 and 145 for the clutch servo and the gear-shifting servo, respectively, are fed by a pressure conduit 183 which in turn is fed by a pressure conduit 184 leading from the output side of a pump 185, to be described later. The intake conduits 109, 145, 183 and 184 are connected also by a conduit 186 to a source of hydraulic fluid under pressure 187. Such source 187, hereinafter called an accumulator, to be described later, comprises broadly a tank including means for retaining hydraulic fluid therein under pressure. Thus, the hydraulic line or conduit 186 is effective to supply hydraulic fluid under pressure to the servos when the pump is not operating. When the pump is operating, the conduit 186 serves merely to maintain pressure in the accumulator 187. The exhaust conduits 119 and 146 for the servos merge into a single conduit 188 which in turn empties into a storage tank 189, to be described later. The storage tank 189 is combined with the accumulator 187 in a unitary structure. A supply conduit 190 delivers hydraulic fluid from the tank 189 to the intake side of the pump 185 to complete the closed hydraulic circuit.

Referring now to Figures 12, 13 and 14, the pump 185, according to the invention, is a gear pump and comprises a housing 191, which encloses a pump block 192, which is secured in any suitable manner to an appropriate part of the frame 27 of the motorcycle. In practice, we have found it desirable to mount the pump on the valve gear plate of the motorcycle. The pump block 192 has journaled therein a drive gear 193, which operates in a cylinder 204 in the block and which includes a drive shaft 194. The drive shaft 194 has a splined connection 202 with a clutch shaft 195 having driven clutch teeth 197 of the ratchet type formed on its free end. A driving clutch having complementary ratchet teeth 198 normally engages the driven clutch teeth 197, whereby to rotate the shaft 194 in the direction of the arrow, Figure 12. The driving clutch 198 is connected to the motorcycle engine in any suitable manner, not shown. The spline connection 102 is loaded by a spring 196 which is interposed in a pair of telescoping recesses formed on the abutting ends of the shafts 194 and 195. Thus, the spring 196 loads the ratchet teeth 197 to maintain the same normally engaged with the driving ratchet teeth 198. However, it is obvious that the spring 196 will permit yielding of the clutch shaft 195 if reverse rotation of the parts are attempted, whereby the teeth 197 and 198 will ride over each other in a well known manner. This feature protects the gear pump from damage in the event of back-firing of the motorcycle engine. The opposite side of the driving gear 193 is formed to provide an axial socket 200 of any suitable form which is adapted to be engaged by a crank, not shown, of any suitable type to permit hand operation of the pump when, for any reason, it is necessary to actuate the pump by hand. The crank is applied to the socket 200 through an opening 201 formed in the housing 191 in alignment with the driving gear 193. The driving gear 193 is in mesh with a usual idler gear 203 which is also operative in the cylinder 204.

The pump block 192 is provided with a conduit 205 in open communication with the supply conduit 190 from the tank 189. Such conduit or passage 205 in turn opens into a feed passage 206 which leads to a cylinder 204 in which the gears operate. The gears 193 and 203 operate in the usual manner of gear pumps and deliver fluid under pressure to the output passage 207 leading from the cylinder 204. The pressure line 184 is in communication with the output passage 207 by way of a ball valve 208 loaded by a spring 209 to comprise a non-return valve. The output passage 207 is also in communication with a relief passage 214 by way of a ball check valve 210, which is spring loaded, as at 211, to provide a non-return valve. The tension of the spring 211 is adjusted by a screw 212, access to which may be had through an opening 213 in the housing 191 of the pump. The relief passage 214 in turn is in open communication with the intake passage 206 leading to the cylinder 204. Thus, when hydraulic pressure is once built up in the pressure line 184 and is not needed by the servos, additional fluid supplied to the pump is simply recirculated through the outlet passage 207, ball valve 210, relief passage 214 and back into the cylinder 204 by way of the intake passage 206. This is necessary because the gears 193 and 203 are normally driven by the engine of the motorcycle so that they are in constant operation whenever the engine is running. Obviously, most of the time while the engine is running, there will be no need for actuation of the servos.

Referring to Figure 11 of the drawing, the storage tank 189 comprises a shell of any suitable metallic material into which the exhaust conduit 188 opens. The tank 189 is provided with a suitable upwardly-opening vent 215 which opens therefrom at the upper end thereof. There is also provided a filler plug 216 for replenishing the fluid in the tank 189. Such plug is obviously located in an upper portion of the tank. The bottom of the tank includes a cylindrical strainer 217 of any suitable strainer material, which is secured axially of the tank by means of an arcuate plate 218 which is secured across an opening 219 in the bottom of the tank by any suitable fastening members 220. The supply conduit 190 is connected to the cylindrical strainer 217 axially thereof. Adjacent the strainer 217 in the bottom of the tank 189 there is provided a drain plug 221 for draining the tank.

The accumulator 187 is integral with the storage tank 189 and includes a concavo-convex wall 222 which closes the top of the storage tank 189. The convex side of the wall 222 extends into the storage tank 189 and is closed at the top by a flexible diaphragm 224 which is secured across the top of the concave side of the wall 222 by any suitable fastening means 225. This structure provides a pressure chamber 223 which is substantially hemispherical in shape. Also secured across the top of the tank 189 is a domed shell 226 which is secured in place by the fastening means 225 aforesaid, and which comprises a substantially hemispherical air chamber 227 on the opposite side of the diaphragm 224. An air inlet 228 is formed in the top of the shell 226 and is controlled by a one-way air valve 229 of any suitable form, and which is effective to admit air to the chamber 227, but prevents the escape of air therefrom. In operation, the pump 185 supplies hydraulic fluid to the accumulator by way of the conduit 186 which empties into the pressure chamber 223 at the bottom thereof. As hydraulic fluid fills the chamber 223, the diaphragm 224 is distended to the broken line position, Figure 11, whereby to compress air in the air chamber 227. The resilience inherent in the compressed air in the chamber 227, plus the natural resiliency of the flexible diaphragm 224, serves to impose pressure upon the fluid in the pressure chamber 223, whereby, in the event that the pump 185 is not operating, as when the engine is idle, there will be sufficient hydraulic fluid under pressure in the chamber 223 to operate both of the servos for at least one operation. As pressure drops in the chamber 223, the diaphragm 224 will tend to return to normal under pressure of air in the air chamber 227. Air under pressure is admitted to chamber 227 as needed via the valve 229. In normal operation, however, the accumulator 187 is not needed, and operating pressure for the servos is obtained in the usual manner from the pump 185. At the same time, by virtue of the connection of the accumulator to the pressure line 184 of the pump, a constant pressure is maintained in the pressure tank 223 of the accumulator for use when needed.

To sum up the foregoing operation, when the gears are in neutral with the engine running, to engage a gear, the operator merely closes the desired selector switch to close a circuit to the clutch servo solenoid, whereby the same is operated to disengage the clutch. At the end of the declutching operation, the switch 89 is operated to close a circuit to one of the gear-shifting servo solenoids, whereby to drive the same in an appropriate direction to perform the selected gear-shifting act. At the conclusion of the gear-shifting operation, the selected brush 63 of the slider 60 is centered on its insulated gap 68 in the junction box 47, whereby to open the circuit. Upon opening of the circuit, the appropriate gear-shifting servo solenoid is de-energized, whereby to shut off the flow of hydraulic fluid to cylinder 142 and lock piston 143. Simultaneously, the clutch servo solenoid is de-energized, whereby to reverse the clutch servo slide valve and admit fluid to cylinder 107 to drive the piston 108 in a direction to engage the clutch.

Of course, the selected relay 72 or 80 opens as the circuit breaks. In this connection, it is noted that one of the one way relays 72 or 80 is always open to prevent back flow of current to the end of the junction box opposite to that through which current is flowing, whereby to prevent simultaneous energization of both of the gear-shifting servo solenoids.

The tell-tale signal 97 is actuated immediately before the clutch engages, and normally stays actuated until the clutch is disengaged. The clutch safety switch 104 is effective only to actuate the clutch servo to disengage and engage the clutch when the operator wishes to stop and leave the vehicle in gear. Actuation of this safety switch 104 from the "go" to the "stop" position closes a circuit to the clutch servo solenoid whereby the clutch is disengaged. As the clutch is disengaged, switch 89 is actuated as usual. However, no circuit is established to either of the gear-shifting servo solenoids, as no actuation of a selector switch has been made since the last gear-shifting act. Consequently, the appropriate slider brush is still centered on its insulating gap. Thus, no actuation of either slide valve for the gear-shifting servo results. When an operator wishes to start up, he merely reverses the clutch safety switch from the "stop" to the "go" position, whereby the circuit to the clutch servo solenoid is broken, the clutch servo slide valve is reversed, and the clutch is re-engaged.

While we have shown and described what is now thought to be the preferred embodiment of our invention, it is to be understood that the same is susceptible of other forms and expressions. Consequently, we do not limit ourselves to the precise structure shown and described hereinabove except as hereinafter claimed.

We claim:

1. In a change-speed device, the combination with a variable speed transmission including a plurality of shiftable gears, gear-shifting means, a driving shaft, a clutch operatively connecting said shaft to said transmission, and clutch-actuating means for engaging and disengaging said clutch; of separate clutch and gear-shifting servos for separately actuating said gear-shifting and clutch-actuating means, electric control means for said servos including a plurality of normally open circuits, a junction box, each circuit including a substantially identical slide rod, insulating means rigidly mounting said rods in said junction box in laterally-spaced parallel relation, a slider slidable on all of said rods within said junction box, a separate contact brush slidably engaging each rod and carried by said slider, means insulating said brushes from each other, a separate stationary contact bar slidably engaged by each brush, said contact bars being fixed in said junction box substantially parallel to said rods and being spaced and insulated therefrom, a gap in each bar, said gap of each bar being staggered longitudinally relative to every other gap, bus bars connecting the opposite ends of said contact bars, selector means operative upon actuation to establish a selected circuit through a slide rod, a brush, a contact bar and a bus bar to said control means for said clutch servo whereby to actuate the latter to disengage said clutch, means operative upon disengagement of said clutch to establish said circuit to said control means for said gear-shifting servo whereby to actuate the latter to perform a selected gear-shifting operation, means operatively connecting said gear-shifting servo to said slider to slide the same and the selected brush toward said gap of said selected contact bar, said gap being positioned to open said circuit at the completion of said shifting operation, and means operative upon the opening of said circuit to lock said gear-shifting servo and re-engage said clutch.

2. In a change-speed device, the combination with a variable speed transmission including a plurality of shiftable gears, gear-shifting means, a driving shaft, a clutch operatively connecting said shaft to said transmission, and clutch-actuating means for engaging and disengaging said clutch; of separate clutch and gear-shifting servos for separately actuating said gear-shifting and clutch-actuating means, electric control means for said servos including a plurality of normally open circuits, a junction box, said box including a plurality of pairs of spaced and insulated stationary contacts, there being a pair of such contacts for each circuit, each circuit being operatively connected to one contact of each pair, a movable contact bridging each pair of contacts, one stationary contact of each pair being formed with a gap therein, said gaps being staggered relative to each other, selector means operative upon actuation to establish a selected circuit across its related pair of stationary contacts over the related movable contact to said control means for said clutch servo whereby to actuate the latter to disengage said clutch, means operative upon disengagement of said clutch to establish said selected circuit to said control means for said gear-shifting servo whereby to actuate the latter to perform a selected gear-shifting operation, means operatively connecting said gear-shifting servo to said movable contact and operative to move the same toward said gap during said operation and to position said movable contact over said gap at the completion of said operation whereby to open said selected circuit, and means operative upon the opening of said circuit to lock said gear-shifting servo and simultaneously actuate said clutch servo to re-engage said clutch.

3. In a change-speed device, the combination with a variable speed transmission including a plurality of shiftable gears, gear-shifting means, a driving shaft, a clutch operatively connecting said shaft to said transmission, and clutch-actuating means for engaging and disengaging said clutch; of separate clutch and gear-shifting servos for separately actuating said gear-shifting and clutch-actuating means, electric control means for said servos including a plurality of normally open circuits, a junction box, said box including a plurality of spaced stationary contacts, a plurality of movable contacts, there being a movable contact in operative contact with each stationary contact, means operatively connecting each circuit to one of said movable contacts, each of said stationary contacts being formed with a gap therein, said gaps being staggered, a single means mounting all of said movable contacts for simultaneous movement along said stationary contacts, selector means operative upon actuation to establish a selected circuit across a selected pair of movable and stationary contacts to said control means for said clutch servo whereby to actuate the latter to disengage said clutch, means operative upon disengagement of said clutch to establish said selected circuit to said control means for said gear-shifting servo whereby to actuate the latter to perform a selected gear-shifting operation, means operatively connecting said gear-shifting servo to said mounting means for said movable contact and operative to move the same toward said gap of said selected stationary contact during said operation and to position said selected movable contact over said gap at the completion of said operation whereby to open said selected circuit, and means operative upon the opening of said circuit to lock said gear-shifting servo and simultaneously actuate said clutch servo to re-engage said clutch.

4. In a change-speed device, the combination with a variable speed transmission including a plurality of shiftable gears, gear-shifting means, a driving shaft, a clutch operatively connecting said shaft to said transmission, and clutch-actuating means for engaging and disengaging said clutch; of separate clutch and gear-shifting servos for separately actuating said gear-shifting and clutch-actuating means, electric control means for said servos including a plurality of normally open circuits, a junction box, said box including a plurality of spaced stationary contacts, a plurality of movable contacts, there being a movable contact in operative contact with each stationary contact, means operatively connecting each circuit to one of said movable contacts, each of said stationary contacts being formed with a gap therein, said gaps being staggered, a single means mounting all of said movable contacts for simultaneous movement along said stationary contacts, selector means operative upon actuation to establish a selected circuit across a selected pair of movable and stationary contacts to said control means for said clutch servo whereby to actuate the latter to disengage said clutch, means operative upon disengagement of said clutch to establish said selected circuit to said control means for said gear-shifting servo whereby to actuate the latter to perform a selected gear-shifting operation, means operatively connecting said gear-shifting servo to said mounting means for said movable contact and operative to move the same toward said gap of said selected stationary contact during said operation and to position said selected movable contacts over said gap at the completion of said operation whereby to open said selected circuit, said clutch and gear-shifting servos comprising a separate hydraulic cylinder, piston and valve chest units for each, said control means for said clutch servo comprising a double-action slide valve and a solenoid operatively connected thereto to open said valve upon energization and move said piston and disengage said clutch and operative upon de-energization to reverse said valve and reverse the movement of its piston whereby to re-engage said clutch, said gear-shifting servo comprising a pair of normally closed single-action slide valves in the related valve chest, each operative to drive said piston in an opposite direction, a solenoid operatively connected to each of said last named slide valves and operative upon energization to open the same, a lead connecting portions of each stationary contact on one side of said gap to said first solenoid and to one of said last-named solenoids, a separate lead connecting portions of each stationary contact on the opposite sides of said gaps to said first solenoid and to the other of said last-named solenoids, a one-way relay interposed in each of said last-named leads whereby but one of said last-named solenoids will be energized at a time, and means delaying actuation of said last-named solenoids until said clutch is disengaged.

5. In a change-speed device, the combination with a variable speed transmission including shiftable gears, a driving shaft, a clutch operatively connecting said shaft to said transmission, and gear-shifting means; of a hydraulically-powered clutch-actuating servo, comprising a unit including a valve chest, a cylinder, a piston in said cylinder and a piston rod adapted to be operatively connected to said clutch for disengaging the same upon movement of said piston rod in one direction with said piston and for engaging said clutch upon movement of said piston rod in the opposite direction, said valve chest including two laterally-aligned pairs of conduits, one conduit of each pair being an inlet conduit for the passage of hydraulic fluid under pressure to an opposite end of said cylinder, the other conduit of each pair being an exhaust conduit for the passage of exhausted hydraulic fluid from opposite ends of said cylinder, a double-action slide valve, means slidably mounting said valve in said chest across all of said conduits, said valve being formed with a pair of spaced ports for each pair of conduits, said ports being arranged to cause said cylinder to be driven in a clutch-disengaging direction with said valve in one position and to be driven in a clutch-engaging direction with said valve in an opposite position, means biasing said valve in said last-named position, a solenoid having its armature operatively connected to said valve, said solenoid being operative upon energization to move said valve to said first position, and means for energizing said solenoid.

6. The structure of claim 5, and means for regulating the flow of fluid in said inlet conduits whereby to regulate the speed of operation of said piston.

7. In a change-speed device, the combination with a variable speed transmission including shiftable gears, a driving shaft, a clutch operatively connecting said shaft to said transmission, and means for actuating said clutch; of a hydraulically-powered gear-shifting servo, comprising a unit including a valve chest, a cylinder, a piston in said cylinder, a pair of piston rods fixed to said piston and extending outwardly of said cylinder in opposite directions, said valve chest including two pairs of spaced conduits, the conduits of each pair being inlet and exhaust conduits for opposite ends of said cylinder whereby each pair of conduits when open is operative to drive said piston in an opposite direction, a pair of single-action slide valves, means slidably mounting each valve in said chest across a different pair of conduits, each valve being adapted in one position to close its pair of inlet and exhaust conduits and in an opposite position to open its pair of inlet and exhaust conduits, means biasing both of said valves to said first positions, separate solenoid means operatively connected to each valve and each operative upon energization to move a valve to the second position, one of said piston rods being adapted to be connected to gear-shifting means, means associated with said other piston rod for selectively energizing one of said solenoids whereby to actuate said piston in a selected direction to perform a selected gear-shifting operation, and means automatically de-energizing said selected solenoid upon completion of said selected operation.

8. The structure of claim 7, and means for regulating the flow of fluid in said inlet conduits whereby to regulate the speed of operation of said piston.

9. In a change-speed device, the combination with a variable speed transmission including shiftable gears, a driving shaft, a clutch operatively connecting said shaft to said transmission, and means for actuating said clutch; of a hydraulically-powered gear-shifting servo, comprising a unit including a valve chest, a cylinder, a piston in said cylinder, means operatively connected to said piston for performing selected gear-shifting operations upon movement of said piston in either direction, a pair of normally closed single-action slide valves in said valve chest, each of said valves being operative when opened to drive said piston in an opposite direction, a solenoid operatively connected to each valve and operative upon energization to open the same, means movable with said piston and operative to energize a selected solenoid whereby to actuate said piston to perform a selected gear-shifting operation, and means automatically de-energizing said selected solenoid upon completion of said selected operation.

10. In a change-speed device, the combination with a variable speed transmission including shiftable gears, a driving shaft, a clutch operatively connecting said shaft to said transmission, and gear-shifting means; of a hydraulically-powered clutch-actuating servo, comprising a unit including a valve chest, a cylinder, a piston in said cylinder, and means operatively connecting said piston and clutch whereby actuation of said piston in one direction is effective to disengage said clutch and in the other direction is effective to engage said clutch, a double-action slide valve in said chest operative in opposite positions to drive said piston in opposite directions, means biasing said valve to a clutch-engaging position, a solenoid operatively connected to said valve and operative upon energization to move said valve to a clutch-disengaging position, and means for energizing said solenoid.

11. In a change-speed device, the combination with a variable speed transmission including shiftable gears, a driving shaft and a clutch operatively connecting said shaft to said transmission, of a hydraulically powered gear shifting servo, comprising a unit including a valve chest, a cylinder, a piston in said cylinder, means operatively connected to said piston for performing selected gear shifting operations upon movement of said piston in either direction, a pair of normally closed single action slide valves in said valve chest, each of said valves being operative when open to drive said piston in a different direction, a solenoid operatively connected to each valve and operative upon energization to open the same, means movable with said piston and operative to energize a selected solenoid whereby to actuate said piston to perform a selected gear shifting operation, means automatically deenergizing said selected solenoid upon completion of said selected operation, a hydraulically powered clutch actuating servo, comprising a unit including a valve chest, a cylinder, a piston in said last named cylinder and means operatively connecting said last named piston and clutch whereby actuation of said last named piston in one direction is effective to disengage said clutch and in the other direction is effective to engage said clutch, a double action slide valve in said last named valve chest operative to control through a pressure to one side or the other of said last named piston to thereby control its movement in one direction or the other, means biasing said double action slide valve to a clutch engaging position, a solenoid operatively connected to said last named valve, said last named solenoid being operative upon energization to move said double action slide valve to a clutch disengaging position, and means for energizing said last named solenoid.

12. In a change-speed device, the combination with a variable speed transmission including a plurality of shiftable gears, gear-shifting means, a driving shaft, a clutch operatively connecting said shaft to said transmission, and clutch-actuating means for engaging and disengaging said clutch; of separate clutch and gear-shifting servos for separately actuating said gear-shifting and clutch-actuating means, electric control means for said servos including a plurality of normally open circuits, a junction box, said box including a plurality of spaced stationary contacts, a plurality of movable contacts, there being a movable contact in operative contact with each stationary contact, means operatively connecting each circuit to one of said movable contacts, each of said stationary contacts being formed with a gap therein, said gaps being staggered, a single means mounting all of said movable contacts for simultaneous movement along said stationary contacts, selector means operative upon actuation to establish a selected circuit across a selected pair of movable and stationary contacts to said control means for said clutch servo whereby to actuate the latter to disengage said clutch, means operative upon disengagement of said clutch to establish said selected circuit to said control means for said gear-shifting servo whereby to actuate the latter to perform a selected gear-shifting operation, means operatively connecting said gear-shifting servo to said mounting means for said movable contact and operative to move the same toward said gap of said selected stationary contact during said operation and to position said selected movable contact over said gap at the completion of said operation whereby to open said selected circuit, and means operative upon the opening of said circuit to actuate said clutch servo to reengage said clutch.

13. In a change-speed device, the combination with a variable speed transmission including a plurality of shiftable gears, gear-shifting means, a driving shaft, a clutch operatively connecting said shaft to said transmission, and clutch-actuating means for engaging and disengaging said clutch; of separate clutch and gear-shifting servos for separately actuating said gear-shifting and clutch-actuating means, electric control means for said servos including a plurality of normally open circuits, a junction box, said box including a plurality of separate circuit closers, there being a separate normally closed circuit closer for each of said circuits, a single actuating means for selectively opening each circuit closer, selector means operative upon actuation to establish a selected circuit through the related circuit closer to said control means for said clutch servo whereby to actuate the latter to disengage said clutch, means operative upon disengagement of said clutch to establish said selected circuit to said control means for said gear-shifting servo whereby to actuate the latter to perform a selected gear-shifting operation, means operatively connecting said gear-shifting servo to said actuating means for said selected circuit closer and operative to open the same and said selected circuit at the completion of said operation, and means operative upon the opening of said circuit to lock said gear-shifting servo and simultaneously actuate said clutch servo to reengage said clutch.

14. In a change-speed device, the combination with a variable speed transmission including a plurality of shiftable gears, gear-shifting means, a driving shaft, a clutch operatively connecting said shaft to said transmission, and clutch-actuating means for engaging and disengaging said clutch; of separate clutch and gear-shifting servos for separately actuating said gear-shifting and clutch-actuating means, electric control means for said servos including a plurality of normally open circuits, a junction box, said box including a plurality of separate circuit closers, there being a separate normally closed circuit closer for each of said circuits, a single actuating means for selectively opening each circuit closer, selector means operative upon actuation to establish a selected circuit through the related circuit closer to said control means for said clutch servo whereby to actuate the latter to disengage said clutch, means operative upon disengagement of said clutch to establish said selected circuit to said control means for said gear-shifting servo whereby to actuate the latter to perform a selected gear-shifting operation, means operatively connecting said gear-shifting servo to said actuating means for said selected circuit closer and operative to open the same and said selected circuit at the completion of said operation, and means operative upon the opening of said circuit to actuate said clutch servo to reengage said clutch.

LEONARD T. WOMACK.
JEWEL JACKSON WOMACK.

REFERENCES CITED

The following references are of record in the file of this patent:

UNITED STATES PATENTS

| Number | Name | Date |
|---|---|---|
| 925,270 | Beemer | June 15, 1909 |
| 1,544,909 | Josephs et al. | July 7, 1925 |
| 1,665,909 | Craig | Apr. 10, 1928 |
| 2,035,678 | Swift | Mar. 31, 1936 |
| 2,073,264 | McDonald | Mar. 9, 1937 |
| 2,235,943 | Mylius | Mar. 5, 1941 |
| 2,244,092 | Wheeler | June 3, 1941 |
| 2,277,914 | Kesling | Mar. 31, 1942 |
| 2,306,521 | Cameron | Dec. 29, 1942 |
| 2,397,883 | Peterson et al. | Apr. 2, 1946 |
| 2,420,890 | MacDuff | May 20, 1947 |